United States Patent
NagarajeGowda et al.

(10) Patent No.: US 11,677,621 B2
(45) Date of Patent: Jun. 13, 2023

(54) SYSTEM FOR GENERATING DATA CENTER ASSET CONFIGURATION RECOMMENDATIONS

(71) Applicant: Dell Products L.P., Round Rock, TX (US)

(72) Inventors: Deepak NagarajeGowda, Cary, NC (US); Bina K. Thakkar, Cary, NC (US); Ashutosh P. Nanekar, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/512,718

(22) Filed: Oct. 28, 2021

(65) Prior Publication Data

US 2023/0136532 A1     May 4, 2023

(51) Int. Cl.
    *H04L 41/0813*     (2022.01)
    *H04L 41/22*     (2022.01)
    *H04L 41/14*     (2022.01)
    *H04L 41/12*     (2022.01)

(52) U.S. Cl.
    CPC .......... *H04L 41/0813* (2013.01); *H04L 41/12* (2013.01); *H04L 41/14* (2013.01); *H04L 41/145* (2013.01); *H04L 41/22* (2013.01)

(58) Field of Classification Search
    CPC ......... H04L 41/0823–0836; H04L 41/12–122; H04L 41/142; H04L 41/14–149; H04L 41/16; H04L 41/0893–0895; H04L 41/22; H04L 43/04–091; G06F 16/9024
See application file for complete search history.

(56) References Cited

U.S. PATENT DOCUMENTS

| | | | | |
|---|---|---|---|---|
| 7,987,262 B2 * | 7/2011 | Tung | ..... | G06F 9/5072 |
| | | | | 709/224 |
| 8,954,574 B1 * | 2/2015 | Chheda | ..... | H04L 41/0826 |
| | | | | 709/224 |
| 9,563,478 B1 * | 2/2017 | Miller | ..... | G06F 9/5038 |
| 10,049,335 B1 * | 8/2018 | Narkier | ..... | G06Q 10/0637 |
| 10,924,559 B1 * | 2/2021 | Kubik | ..... | H04M 15/00 |
| 11,165,655 B1 * | 11/2021 | Lairsey | ..... | H04L 41/12 |
| 11,265,292 B1 * | 3/2022 | Leviseur | ..... | H04L 63/1433 |
| 11,347,559 B2 * | 5/2022 | Hashimoto | ..... | H04L 67/51 |
| 11,411,815 B1 * | 8/2022 | Shrestha | ..... | H04L 41/0896 |
| 11,418,411 B1 * | 8/2022 | Thakkar | ..... | H04L 41/50 |
| 2012/0281706 A1 * | 11/2012 | Agarwal | ..... | H04L 12/4633 |
| | | | | 370/395.53 |

(Continued)

*Primary Examiner* — Brendan Y Higa
(74) *Attorney, Agent, or Firm* — Terrile, Cannatti & Chambers; Stephen A. Terrile

(57) ABSTRACT

A system, method, and computer-readable medium are disclosed for performing a data center monitoring and management operation. The data center monitoring and management operation includes: identifying a plurality of assets within a data center; monitoring usage of the plurality of assets within the data center; generating data center asset profile data based upon the monitoring; identifying a plurality of asset configurations related to the asset profile data; ranking the plurality of asset configurations based upon the data center asset profile data; and, generating a recommended asset configuration recommendation based upon the ranking.

17 Claims, 8 Drawing Sheets

(56) References Cited

U.S. PATENT DOCUMENTS

| | | | |
|---|---|---|---|
| 2015/0067679 A1* | 3/2015 | Naseh | H04L 41/0895 718/1 |
| 2015/0302440 A1* | 10/2015 | Monden | G06Q 30/0206 705/7.35 |
| 2016/0164741 A1* | 6/2016 | Durgin | H04L 43/20 370/255 |
| 2017/0017505 A1* | 1/2017 | Bijani | G06Q 10/20 |
| 2017/0295181 A1* | 10/2017 | Parimi | H04L 63/1433 |
| 2018/0324062 A1* | 11/2018 | Chen | H04L 41/0636 |
| 2018/0357595 A1* | 12/2018 | Rai | G06Q 10/087 |
| 2019/0179725 A1* | 6/2019 | Mital | H04L 67/306 |
| 2019/0349251 A1* | 11/2019 | Weldemariam | H04L 41/0806 |
| 2020/0067800 A1* | 2/2020 | Wang | H04L 41/12 |
| 2021/0029204 A1* | 1/2021 | Bhatnagar | H04L 41/0813 |
| 2021/0160191 A1* | 5/2021 | Ghosh | H04L 47/788 |
| 2022/0374329 A1* | 11/2022 | Savir | G06F 11/3457 |

\* cited by examiner

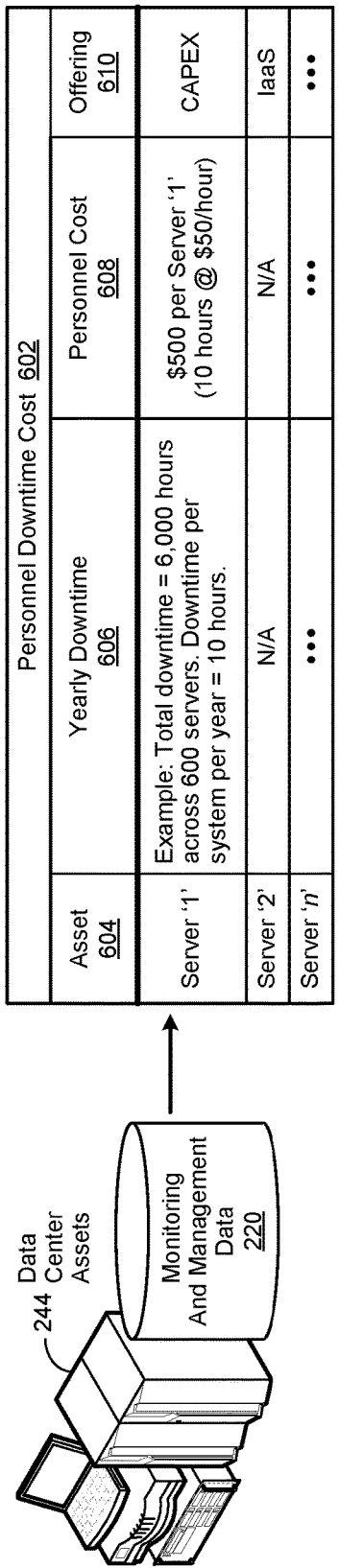

Personnel Downtime Cost 602

| Asset 604 | Yearly Downtime 606 | Personnel Cost 608 | Offering 610 |
|---|---|---|---|
| Server '1' | Example: Total downtime = 6,000 hours across 600 servers. Downtime per system per year = 10 hours. | $500 per Server '1' (10 hours @ $50/hour) | CAPEX |
| Server '2' | N/A | N/A | IaaS |
| Server 'n' | ... | ... | ... |

*Figure 6*

Asset Uptime Percentage 702

| Asset 604 | Jan. | Feb. | Mar. | Apr. | May. | Jun. | Jul. | Aug. | Sep. | Oct. | Nov. | Dec. | Health Score 704 | Health Index 706 | Operational Assessment 708 |
|---|---|---|---|---|---|---|---|---|---|---|---|---|---|---|---|
| Server '1' | 100 | 70 | 70 | 90 | 90 | 100 | 55 | 60 | 90 | 100 | 100 | 100 | 1025 | 1.17 | Degraded health |
| Server '2' | 100 | 100 | 90 | 90 | 90 | 100 | 100 | 100 | 100 | 100 | 100 | 100 | 1170 | 1.03 | Slightly degraded health |
| Server 'n' | 100 | 100 | 100 | 100 | 100 | 100 | 100 | 100 | 100 | 100 | 100 | 100 | 1200 | 1.00 | Ideal health |

*Figure 7*

| Asset 604 | High Issues 802 | Critical Issues 804 | Total Issues 806 | Issue Index 808 | Operational Assessment 810 |
|---|---|---|---|---|---|
| Server '1' | 56 | 34 | 90 | 4.48 | Degraded asset performance |
| Server '2' | 23 | 12 | 35 | 3.27 | Slightly degraded asset performance |
| Server 'n' | 2 | 4 | 6 | 1.87 | Ideal asset performance |

*Figure 8*

| Asset 604 | Offering 610 | Health Operating Index 706 | Issue Operating Index 808 | Total Cost of Ownership (TCO) 910 |
|---|---|---|---|---|
| Server '1' | CAPEX | 1.17 | 4.48 | ((1.86 + 4.48) * Capital Value Of Asset) + ((1.86 + 4.48) * Personnel Costs) * 0.2 |
| Server '2' | IaaS | N/A | N/A | IaaS Data Center Asset Recurring Service Fee * Total Number Of Service Fee Periods |
| Server 'n' | ... | ... | ... | ... |

CAPEX
100TB - 3 Years
$2.6M
1002

IaaS
100TB - 3 Years
$1.1M
1004

CAPEX
1,000TB - 3 Years
$7.6M
1006

IaaS
1,000TB - 3 Years
$1.8M
1008

SYSTEM FOR GENERATING DATA CENTER ASSET CONFIGURATION RECOMMENDATIONS

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: identifying a plurality of assets within a data center; monitoring usage of the plurality of assets within the data center; generating data center asset profile data based upon the monitoring; identifying a plurality of asset configurations related to the asset profile data; ranking the plurality of asset configurations based upon the data center asset profile data; and, generating a recommended asset configuration recommendation based upon the ranking.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a plurality of assets within a data center; monitoring usage of the plurality of assets within the data center; generating data center asset profile data based upon the monitoring; identifying a plurality of asset configurations related to the asset profile data; ranking the plurality of asset configurations based upon the data center asset profile data; and, generating a recommended asset configuration recommendation based upon the ranking.

In another embodiment the invention relates to a computer-readable storage medium embodying computer program code, the computer program code comprising computer executable instructions configured for: identifying a plurality of assets within a data center; monitoring usage of the plurality of assets within the data center; generating data center asset profile data based upon the monitoring; identifying a plurality of asset configurations related to the asset profile data; ranking the plurality of asset configurations based upon the data center asset profile data; and, generating a recommended asset configuration recommendation based upon the ranking.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 6 is a table showing example data center personnel downtime cost factors;

FIG. 7 is a table showing example data center asset uptime health scores;

FIG. 8 is a table showing example data center issue scores;

DETAILED DESCRIPTION

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads.

Various aspects of the invention likewise reflect an appreciation that it has been common in recent years for certain organizations to adopt the use of Infrastructure as a Service (IaaS) data center assets in place of traditional Capital Expenditure (CAPEX) data center assets. Certain aspects of the invention likewise reflect an appreciation that such organizations often want to match the functionality, capabilities, and performance of such IaaS data center asset offerings as closely as possible to their existing CAPEX data center assets. Likewise, various aspects of the invention reflect an appreciation that achieving such a match can often prove challenging. Certain aspects of the invention likewise reflect an appreciation that the respective Total Cost of Ownership (TCO) of equivalent CAPEX and IaaS data center asset offerings is often an important consideration when considering which type of offering to implement.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
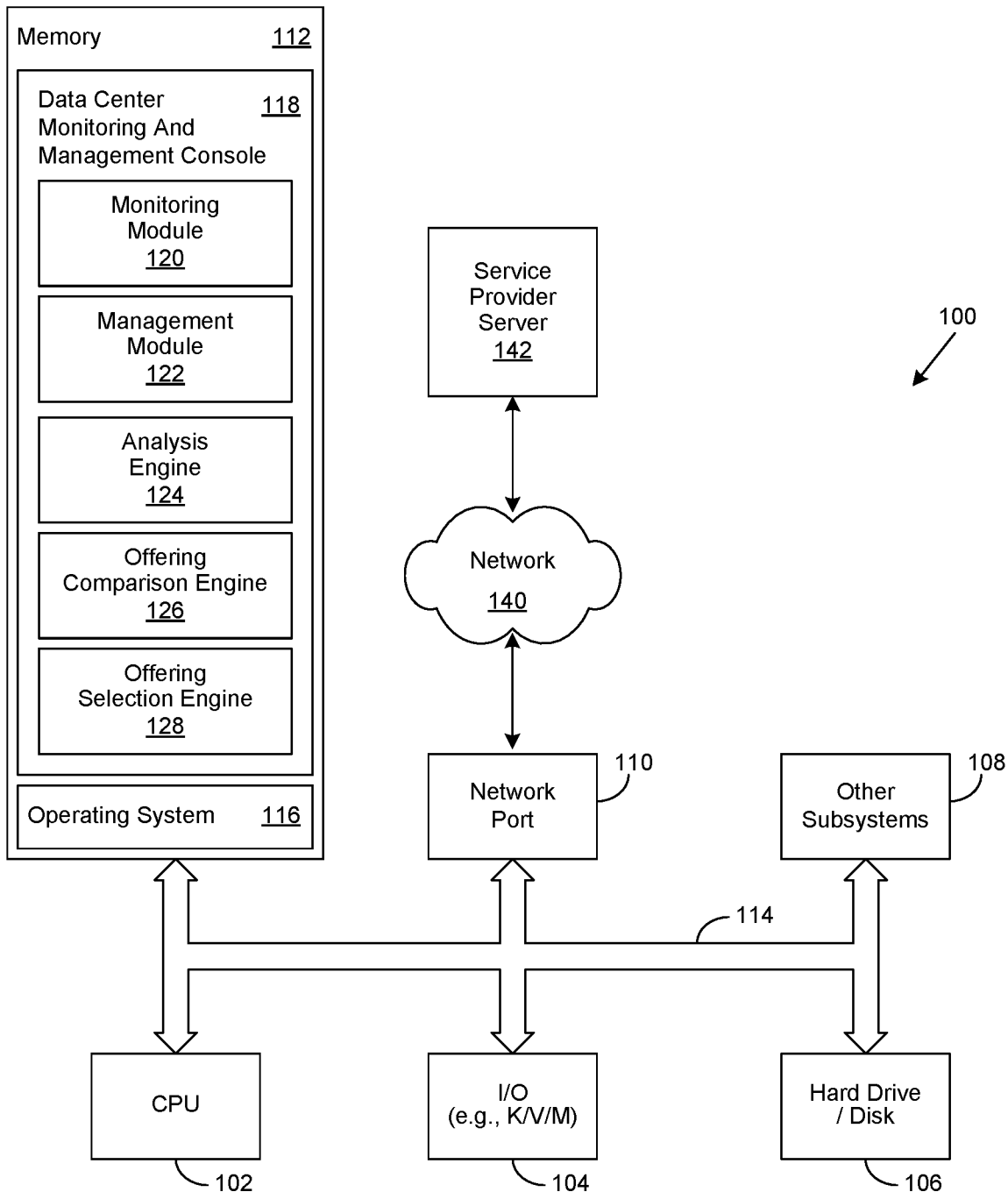
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, an analysis engine 124, an offering comparison engine 126, an offering selection engine 128, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
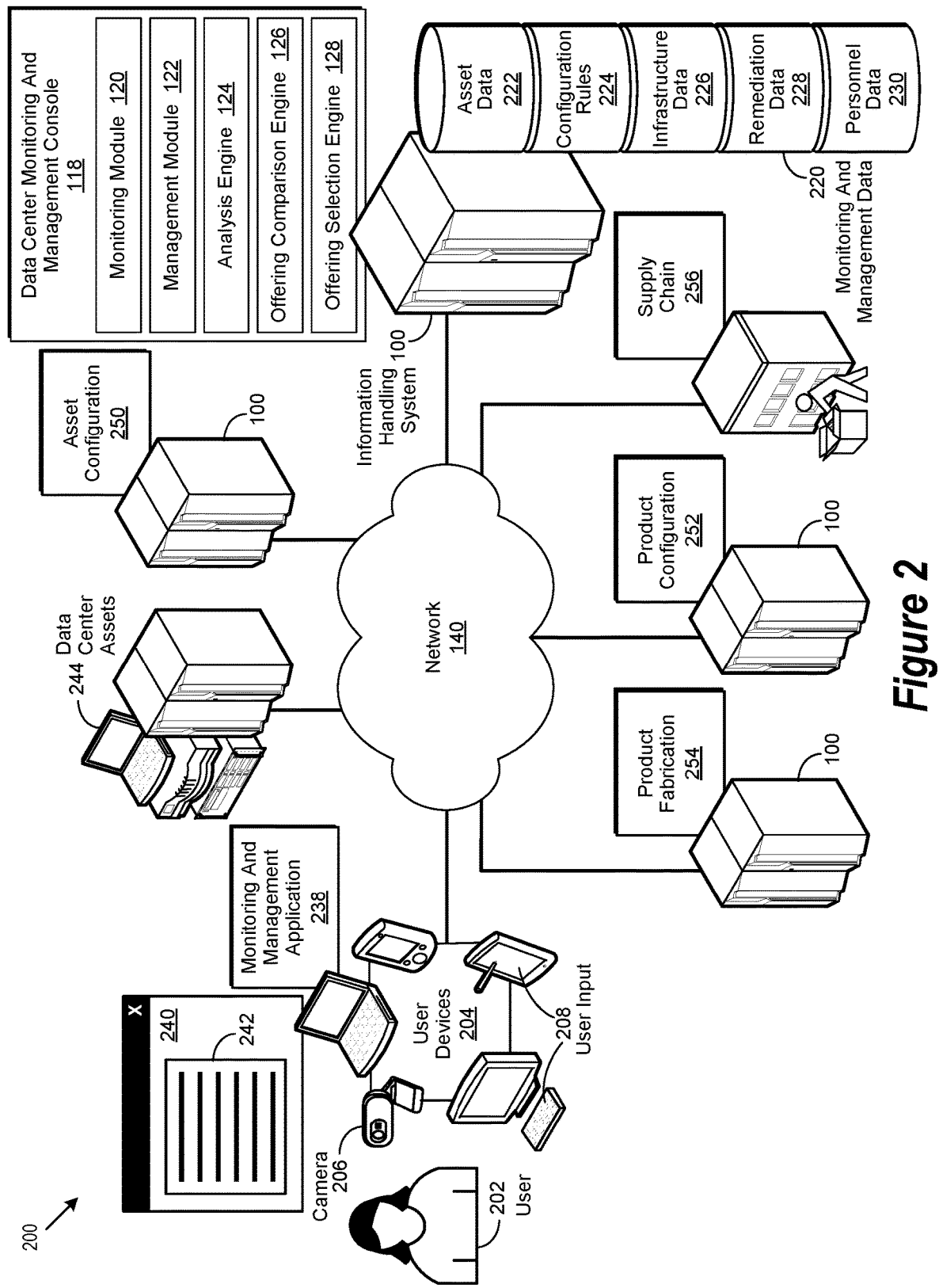
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software applications, software services, firmware code, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, an analysis engine 124, an offering comparison engine 126, and an offering selection engine 128, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle.

In certain embodiments, a data center monitoring and management operation may include a data center asset offering comparison operation, a data center asset offering selection operation, or a combination of the two, as described in greater detail herein. In various embodiments, the monitoring module 120, the management module 122, the analysis engine 126, the offering comparison engine 126, or the offering selection engine 128 may be implemented, individually or in combination with one another, to perform a data center asset offering comparison operation, a data center asset offering selection operation, or a combination of the two, as likewise described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 220, data center asset configuration rules 224, data center infrastructure data 226, data center remediation data 228, and data center personnel data 230.

As used herein, data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 244 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform an analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
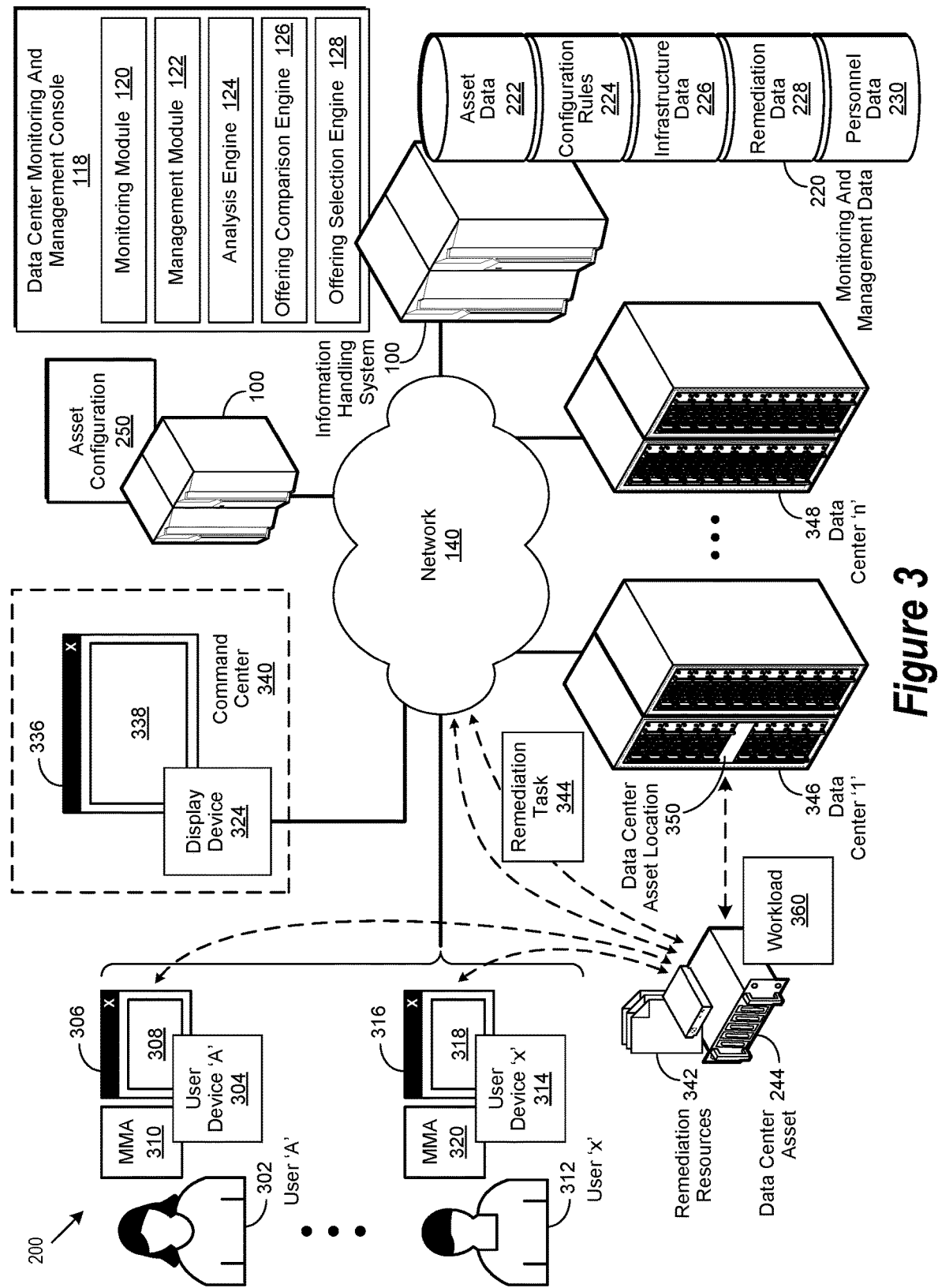
FIG. 3 shows a functional block diagram of the performance of certain data center monitoring and management operations.

FIG. 3 shows a functional block diagram of the performance of certain data center monitoring and management operations implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, an analysis engine 126, an offering comparison engine 126, and an offering selection engine 128, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application (MMA) 310 through 320, described in greater detail herein, may be respectively implemented on user devices 'A' 304 through 'x' 314. In certain embodiments the UI window 306 through 316 may be respectively implemented as a UI window of the data center MMA 310 through 320. In certain embodiments, the data center MMA 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 340, familiar to those of skill in the art, such as a command center 340 typically found in a data center or a network operations center (NOC). In various embodiments, one or more of the users 'A' 302 through 'x' 312 may be located within the command center 340. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 340 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
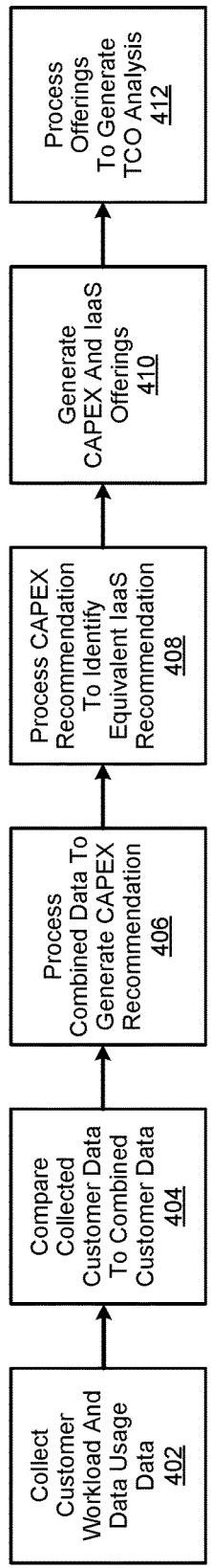
FIG. 4 shows a simplified process flow for generating a data center asset offering and associated total cost of ownership (TCO) analysis.

FIG. 4 shows a simplified process flow implemented in accordance with an embodiment of the invention for generating a data center asset offering and an associated total cost of ownership (TCO) analysis. In various embodiments, certain data center monitoring and management data associated with a particular customer may be collected in step 402, as described in greater detail herein. In various embodiments, the data center monitoring and management data collected in step 402 may include certain customer workload and data usage data. In various embodiments, such customer workload and data usage data may be compared to other customer's workload and data usage data in step 404 to identify certain similarities, as likewise described in greater detail herein.

In various embodiments, the customer's workload and data usage data may be combined with other customer's workload and data usage data and then processed in step 406 to generate a Capital Expenditure (CAPEX) data center asset recommendation for the customer. As used herein, a CAPEX data center asset broadly refers to any functionality or capability provided by an associated tangible data center asset, described in greater detail herein, whose acquisition and implementation involves a capital investment. In various embodiments, the resulting CAPEX data center asset recommendation may then be processed in step 408 to identify an equivalent Infrastructure as a Service (IaaS) data center asset recommendation for the customer. As likewise used herein, an IaaS data center asset broadly refers to any functionality provided by a tangible or intangible data center asset, individually or in combination with one another, likewise as described in greater detail herein, whose provision is provided in the form of a service for a recurring fee and does not involve a capital investment.

The CAPEX and IaaS data center asset recommendations respectively generated and identified in steps 406 and 408 may then be used in step 410 to generate corresponding CAPEX and IaaS data center offerings. As used herein, a data center asset offering broadly refers to a data center asset that is offered for a particular price. As an example, a CAPEX data center asset offering may be offered as a one-time purchase, for a particular price, that includes a capital investment. As another example, an IaaS data center asset offering may be a particular service offered on a recurring basis, such as month-to-month, for a service fee that includes no capital investment.

In certain embodiments, the CAPEX and IaaS data center asset offerings generated in step 410 may offer corresponding data center asset functionality that is substantively the same. In certain embodiments, the IaaS data center asset offering generated in step 410 may offer corresponding data center asset functionality that can be scaled, one way or another, in exchange for an associated change in its recurring service fees. Skilled practitioners of the art will recognize that many such embodiments are possible. Accordingly, the foregoing is not intended to limit the spirit, scope, or intent of the invention.

In certain embodiments, a Total Cost of Ownership (TCO) analysis may be performed for one or more CAPEX data center asset offerings. In various embodiments, the TCO analysis for a CAPEX data center asset offering may be initiated by first converting the cost of all associated data center assets into a yearly or monthly cost based on the initial purchase value and expected life (e.g., number of years) of the data center assets. In certain of these embodiments, the TCO analysis may likewise include a facilities cost that is determined by multiplying the pro-rated cost of the space used by each data center asset by the period of time (e.g., 36 months) it is occupied.

Likewise, in various embodiments, the TCO analysis may include the recurring telecommunication and energy costs corresponding to certain data center assets associated with the CAPEX data center asset offering. In various embodiments, the TCO analysis may likewise include the pro-rated cost of data center personnel involved in the operation and maintenance of the data center assets associated with the CAPEX offering may be determined. Likewise, in various embodiments, the TCO analysis may include the business impact downtime cost of data center assets associated with the CAPEX offering may be determined. In various embodiments, the TCO analysis may likewise include determining the operating cost incurred in running one unit of a particular workload. In certain embodiments, the TCO analysis may include a comparison of the TCO for a particular CAPEX data center asset offering to an equivalent IaaS data center asset offering, as described in greater detail herein.

Figure 5A:
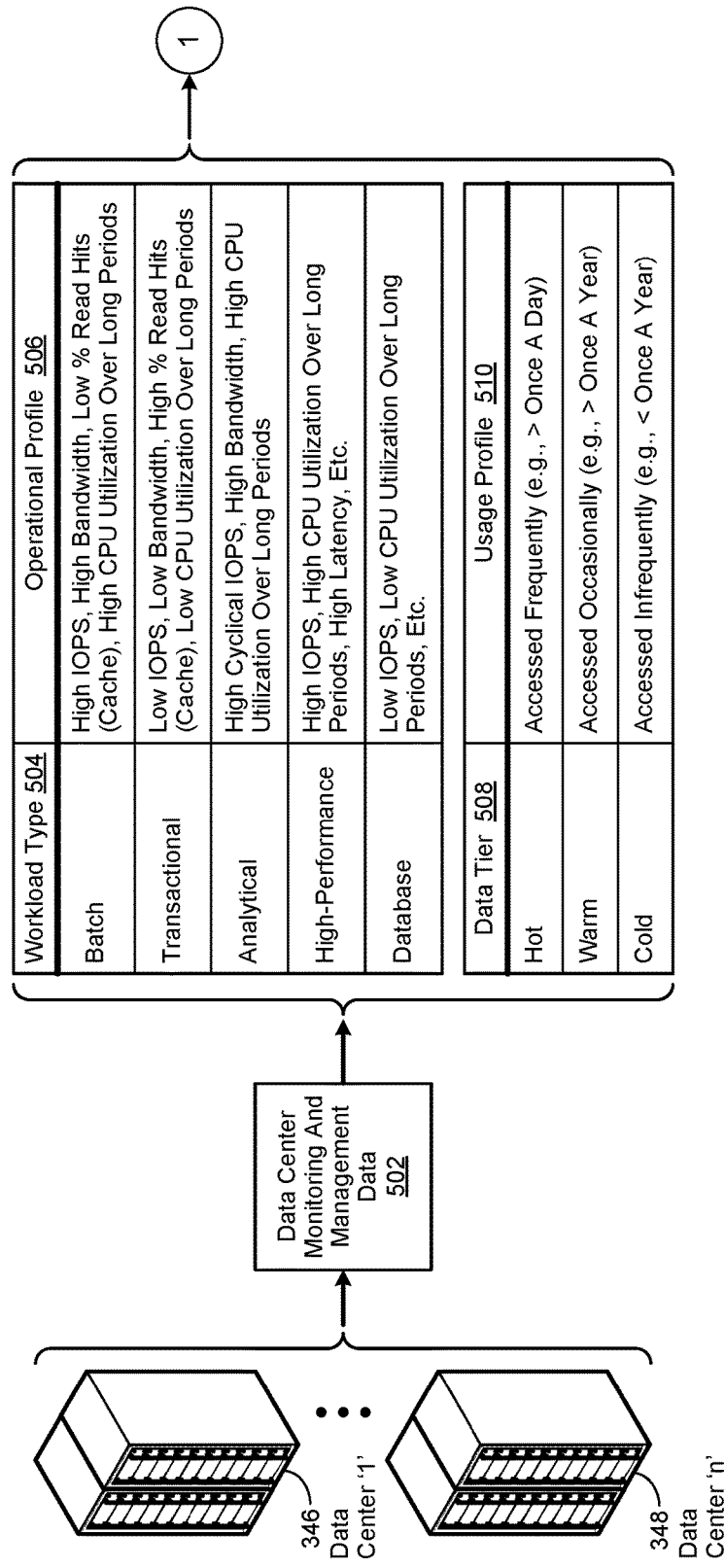
FIGS. 5a through 5c show a simplified process flow of the performance of data center asset comparison and selection operations to generate associated data center asset recommendations and offerings.
Figure 5B:
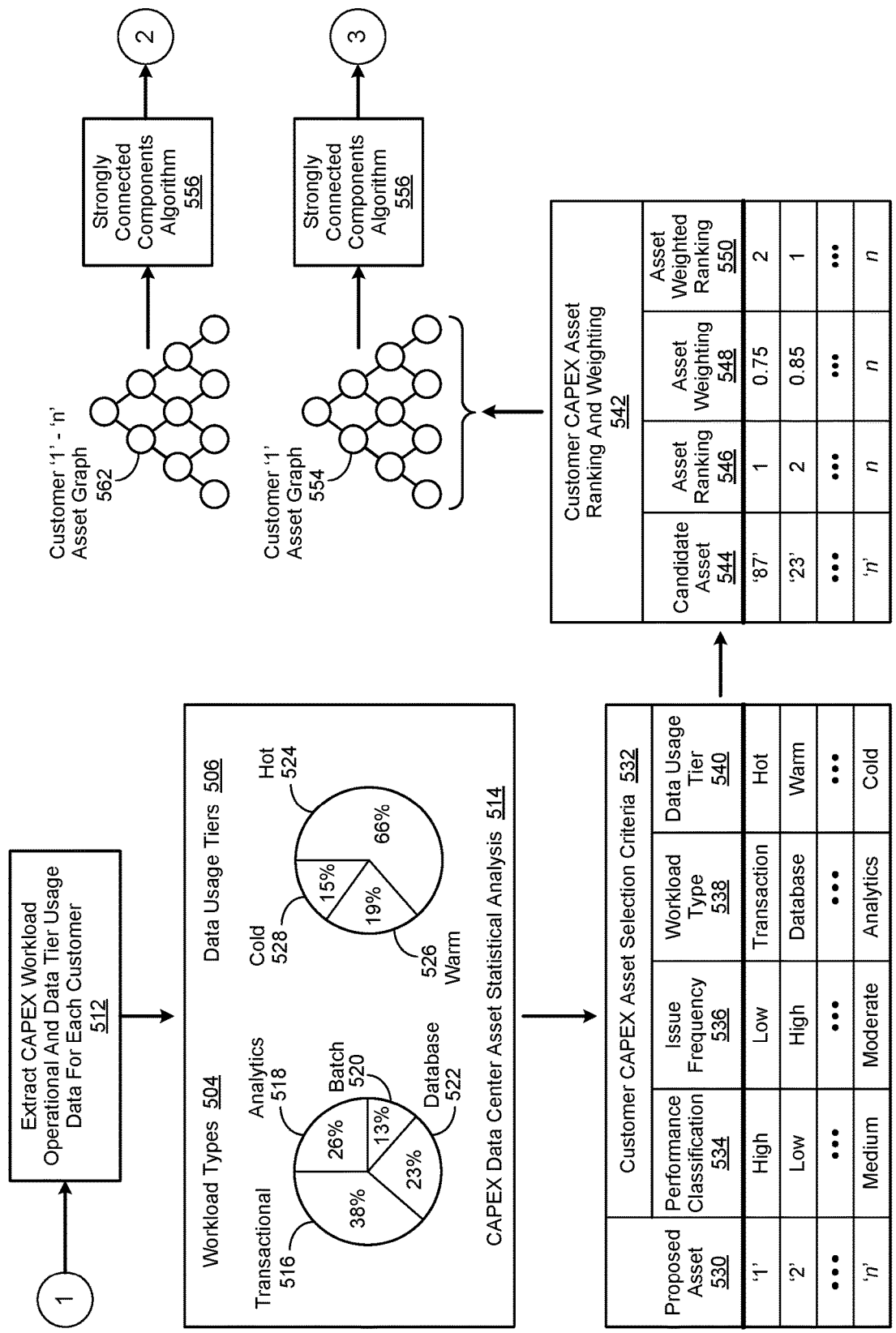
Figure 5C:
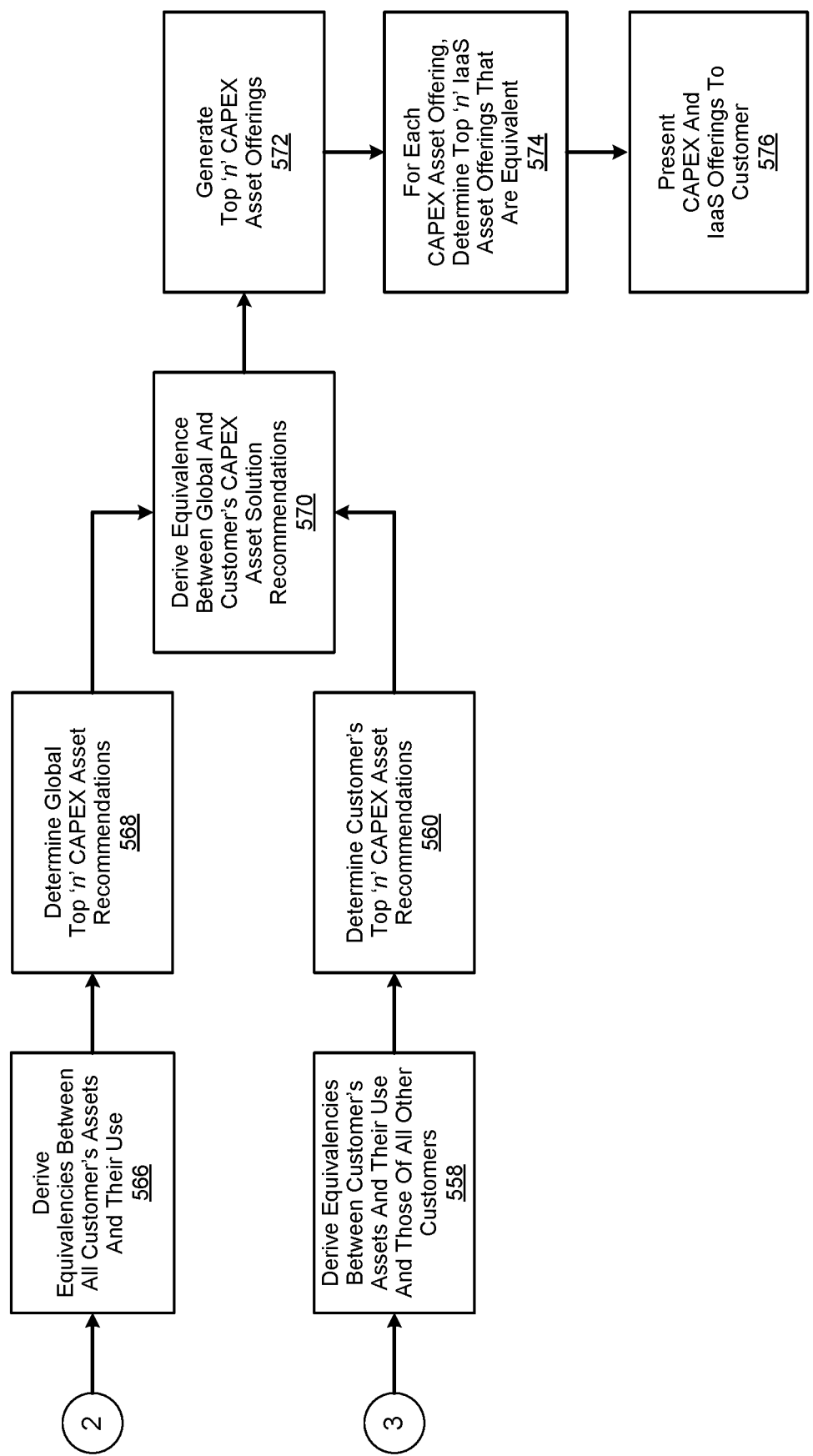

FIGS. 5a through 5c show a simplified process flow of the performance of data center asset comparison and selection operations implemented in accordance with an embodiment of the invention to generate associated data center asset recommendations and offerings. As used herein, a data center asset comparison operation broadly refers to any task, function, procedure, operation, or process performed, directly or indirectly, to compare the respective configuration, functionalities, and capabilities of a proposed data center asset 530 and a candidate data center asset 544. As likewise used herein, a proposed data center asset 530 broadly refers to a data center asset whose capabilities, functionalities, and performance meet certain customer Capital Expenditure (CAPEX) data center asset solution criteria 532, described in greater detail herein. In certain embodiments, the functionalities, capabilities, and performance of a proposed data center asset 530 may mirror that of an existing data center asset (not shown) associated with a particular customer's data center '1' 346 through 'n' 348.

Likewise, as used herein, a candidate data center asset 544 broadly refers to a CAPEX data center asset whose functionalities, capabilities, and performance are substantively equivalent to a particular proposed data center asset 530. As likewise used herein, a data center asset selection operation broadly refers to any task, function, procedure, operation, or process performed, directly or indirectly, to select a particular candidate data center asset 544. A data center asset recommendation, as likewise used herein, broadly refers to a recommendation to select a particular candidate data center asset 544.

In various embodiments, certain data center monitoring and management data described in greater detail herein, corresponding to a particular customer's data center '1' 346 through 'n' 348, may be captured in step 502. In various embodiments, the captured data center monitoring and management data may then be processed to determine a particular workload type 504 and data tier 508 associated with each data center asset implemented at each data center '1' 346 through 'n' 348. In certain embodiments, each workload type 504 may have an associated operational profile 506.

As an example, a transactional workload type 504 may have an associated operational profile 506 that includes low input/output operations per second (TOPS), low bandwidth utilization, a high percentage of read hits (cache), and low Central Processing Unit (CPU) utilization over long periods of time. As another example, high-performance computing (HPC) workload type 504 may have an associated operational profile 506 that includes high TOPS, high CPU utilization over long periods of time, high latency, and so forth.

In various embodiments, each data tier 508 may have an associated usage profile 510. In certain of these embodiments, a particular data tier 508 may be referenced as "hot," "warm," or "cold" to provide an indication of the frequency of its associated data usage. As an example, a "hot" data tier 508 may have an associated usage profile 510 of being accessed frequently, such as less than once a day. To continue the example, online provision of a recently released popular movie may correlate to a "hot" data tier 508, as it is being accessed frequently.

Conversely, a "cold" data tier 508 may have an associated usage profile 510 of being accessed infrequently, such as less than once a year. To continue the previous example, online provision of an obscure European film produced in the 1920's may correlate to a "cold" data tier 508, as it rarely accessed. Skilled practitioners of the art will recognize that many such examples of workload types 504 and data tiers 508, along with their respectively associated operational profiles 508 and usage profiles 510 are possible. Accordingly, the foregoing is not intended to limit the spirit, scope, or intent of the invention.

In various embodiments, certain CAPEX workload operational and data tier usage data may be extracted in step 512 for each data center asset associated with each data center '1' 346 though 'n' 348 each of which is respectively associated with a particular customer. The CAPEX workload operational and data tier usage data may extracted in step 512 may then be used in certain embodiments to generate a CAPEX data center asset statistical analysis 514. In various embodiments, as shown in FIG. 5b, the CAPEX data center asset statistical analysis 514 may be implemented to show the distribution of certain workload types 504 and data usage tiers 506. As an example, the distribution of workload types 504 may be thirty eight percent "transactional" 516, twenty six percent "analytics" 518, thirteen percent "batch" 520, and twenty three percent "database" 5228. Likewise, the distribution of data usage tiers 506 may be sixty six percent "hot" 524, nineteen percent "warm" 526, and fifteen percent "cold" 528.

In certain embodiments, the distribution of certain workload types 504 and data usage tiers 506 may be associated with an individual data center '1' 346 through 'n' 348, which in turn may be associated with a particular customer. In certain embodiments, the distribution of certain workload types 504 and data usage tiers 506 may be associated with two or more data centers '1' 346 through 'n' 348, which may in turn be associated with a particular customer. In certain embodiments, the distribution of certain workload types 504 and data usage tiers 506 may be associated with a group of data centers '1' 346 through 'n' 348, which may in turn be respectively associated with two or more customers. Those of skill in the art will recognize that many such embodiments of CAPEX data center asset statistical analyses are possible. Accordingly, the foregoing is not intended to limit the spirit, scope, or intent of the invention.

In various embodiments, the resulting CAPEX data center asset statistical analysis 514 may be used in combination with the CAPEX workload operational and data tier usage data collected in step 512 to generate one or more proposed data center assets 530, described in greater detail herein. In various embodiments, the one or more proposed data center assets 530 may be presented to a customer with certain associated customer CAPEX data center asset selection criteria 532. In certain embodiments, the customer CAPEX data center asset selection criteria 532 may include a preferred performance classification 518, issue frequency 518, workload type 504, and data usage tier 506 for each customer's CAPEX data center asset 516.

In certain embodiments, the customer may then select their preferences for the customer CAPEX data center asset selection criteria 532 corresponding to a particular proposed data center asset 530. As an example, the customer CAPEX data center asset selection criteria 532 selected by a customer for proposed data center asset 530 '1' includes it being a data center asset solution that has a performance classification 534 of "high," an operational issue frequency 536 of "low," a workload type 538 of "transaction," and a data usage tier 540 of "hot." As another example, the customer CAPEX data center asset selection criteria 532 selected by a customer for proposed data center asset solution 530 '2' includes it being a data center asset solution that has a performance classification 534 of "low," an operational issue frequency 536 of "high," a workload type 538 of "database," and a data usage tier 540 of "warm."

As yet another example, the customer CAPEX data center asset selection criteria 532 selected by a customer for proposed data center asset solution 530 'n' includes it being a data center asset solution that has a performance classification 534 of "medium," an operational issue frequency 536 of "moderate," a workload type 538 of "analytics," and a data usage tier 540 of "cold." Skilled practitioner of the art will recognize that many such embodiments and examples of such customer CAPEX data center asset selection criteria 532 are possible. Accordingly, the foregoing is not intended to limit the spirit, scope, or intent of the invention.

In various embodiments, the customer CAPEX data center asset selection criteria 532 may be used, individually or in combination with the CAPEX workload operational and data tier usage data collected in step 512, or the CAPEX data center asset statistical analysis 514, or both, to generate certain customer CAPEX asset ranking and weighting data 542. In certain embodiments, the customer CAPEX asset ranking and weighting data 542 may be implemented to include one or more candidate data center assets 544 and their associated candidate data center asset ranking values 546, candidate data center asset weighting values 548, and candidate data center asset weighted ranking values 550. In various embodiments, the customer CAPEX data center asset selection criteria 532 may likewise be used, individually or in combination with the CAPEX workload operational and data tier usage data collected in step 512, or the CAPEX data center asset statistical analysis 514, or both, to generate one or more candidate data center assets 544, described in greater detail herein, for a particular proposed data center asset 530. As an example, as shown in FIG. 5b, candidate assets 544 '87', and '23' through 'n' have been generated for proposed data center asset 530 '1'. To continue the example, different candidate assets 544 (not shown) may be generated for each of the proposed data center assets 530 '2' through 'n'.

In various embodiments, the customer CAPEX data center asset selection criteria 532 may likewise be used, individually or in combination with the CAPEX workload operational and data tier usage data collected in step 512, or the CAPEX data center asset statistical analysis 514, or both, to generate an associated data center asset ranking 546 for each candidate data center asset solution 544. In various embodiments, the data center asset ranking 546 for a particular candidate data center asset solution 544 may be qualitative (e.g., highest, higher, medium, lower, lowest, etc.), or quantitative (e.g., a score of '1' on a numeric scale where '1' is the highest possible score, a score of '0.65' where '1.0' is the highest, etc.), or a combination thereof.

As an example, candidate data center assets 544 '87', and '23' through 'n', may all correspond to proposed data center asset solution 530 '1'. As such, they may all, to one degree or another, meet customer CAPEX data center asset criteria 532 of a performance classification 534 of "high," an operational issue frequency 536 of "low," a workload type 538 of "transaction," and a data usage tier 540 of "hot." Accordingly, the data center assets 516 '87', '23', and 'n' are respectively ranked 550 '1', '2' and 'n' dependent upon how well they respectively meet the customer CAPEX data center asset criteria 532.

In certain embodiments, a particular data center asset weighting value 548 (e.g., between '0' and '1') may be applied to each candidate data center asset ranking value 546 to indicate a degree of confidence that the data center asset ranking value 548 accurately reflects the best choice for a particular candidate data center asset 544. For example, a data center asset weighting value 548 of '0.75' may be associated with candidate data center asset 544 '87', which has a candidate data center asset ranking 550 of '1', while a data center asset weighting value 548 of '0.85' may be associated with candidate data center asset 516 '23'. In this example, the data center asset weighting value 548 of '0.85' for candidate data center asset 544 '23' may be higher than the data center asset weighting value 548 of '0.75' for candidate data center asset 544 '87' due to the customer having a large number of candidate data center asset solutions 544 '23' currently implemented and no instances of a candidate data center asset solution 544 '87' being implemented in one or more associated data centers '1' 346 through 'n' 348.

As a result, candidate data center asset solution 544 '23' has a candidate data center asset weighted ranking value 550 of '1', which is higher than the candidate data center asset weighted ranking value of '2' associated with candidate data center asset solution 544 '1'. Accordingly, in certain embodiments, the candidate data center asset weighted ranking value 550 may be used as an indicia to indicate which candidate data center asset 544 most closely meets the customer CAPEX data center asset criteria 532 associated with a particular proposed data center asset 530. In these embodiments, the method by which the candidate data center asset weighted ranking value 550 is determined is a matter of design choice.

In various embodiments, the CAPEX workload operational and data tier usage data collected in step 512, the customer CAPEX data center asset selection criteria 532, the CAPEX data center asset statistical analysis 514, and the customer CAPEX ranking and weighting data 542 may be used, individually or in combination, to generate certain graph data. In certain of these embodiments, the graph data may be stored in a graph database, familiar to skilled practitioners of the art. In certain embodiments, the graph data may be used to generate a data center asset graph, likewise familiar to those of skill in the art, for a particular customer '1' 554 and for customers '1' through 'n' 562.

In various embodiments, certain data center assets associated with customer data centers '1' 346 through 'n' 348, certain proposed data center assets 530, and certain candidate data center assets 544, or a combination thereof, may be represented as nodes within the a customer data center asset graph for a particular customer '1' 554 and for customers '1' through 'n' 562. In certain of these embodiments, the edges of the customer data center asset graphs for a particular customer '1' 554, and for customers '1' through 'n' 562, may be implemented to represent candidate data center asset weighting values 548. For example, individual graph edges may have different lengths, with shorter lengths indicating a stronger connection between individual nodes, which it turn may respectively represent existing data center assets associated with data centers '1' 346 through 'n' 348, proposed data center assets 530, and candidate data center assets 544, or a combination thereof.

In various embodiments, a strongly connected components algorithm 556, familiar to skilled practitioners of the art, may be used to process the customer data center asset graph for customers '1' through 'n' 562, to derive certain equivalencies 566 between all customer's data center assets and their respective use. In certain of these embodiments, the resulting derived similarities may be used in step 568 to determine the global top 'n' number of CAPEX data center asset recommendations, where the numeric value of 'n' is a matter of design choice. In various embodiments, a strongly connected components algorithm 556 may likewise be used to process the customer data center asset graph for a particular customer '1' 554 to derive certain equivalencies 558 between the customer's data center assets, and their respective use, and those of all other customers. In certain of these embodiments, the resulting derived similarities may be used in step 560 to determine the top 'n' number of CAPEX data center asset recommendations for the customer, where the numeric value of 'n' is a matter of design choice.

In various embodiments, equivalencies between the global top 'n' number of CAPEX data center asset recommendations and the top 'n' number of customer CAPEX data center asset recommendations may be derived in step 570. In certain embodiments, the resulting equivalencies may then be used in step 572 to generate the top 'n' number of CAPEX data center asset offerings, described in greater detail herein. In various embodiments, the top 'n' number of CAPEX data center asset offerings generated in step 572 may then be processed in step 574 to determine the top 'n' number of IaaS data center asset offerings, likewise described in greater detail herein, that are most equivalent. In certain embodiments, the resulting top 'n' number of CAPEX and IaaS data center asset offerings may then be presented to the customer in step 576.

FIG. 6 is a table showing example data center personnel downtime cost factors implemented in accordance with an embodiment of the invention. In various embodiments, certain data center assets 244 may be monitored to collect associated data center monitoring and management data 220, described in greater detail, which in turn may be processed to determine the data center personnel cost of associated downtime 602. For example, as shown in FIG. 6, data center asset 604 server '1' is a Capital Expenditure (CAPEX) data center asset offering 610, described in greater detail herein.

In this example, a particular data center may have implemented 600 instances of server '1', with an associated total downtime of 6,000 hours, resulting in an average of ten hours of downtime for each instance. To continue the example, the average hourly cost of data center personnel that may be affected by such downtime is $50 per hour. Accordingly, the average personnel downtime cost is $500 per year for each instance of server '1'. Conversely, data center asset 604 server '2' is an Infrastructure as a Service (IaaS) data center asset offering 610, likewise described in greater detail herein. Accordingly, it has not associated yearly downtime 606 cost as the cost 608 of all data center personnel associated with its provision is included in its recurring service fee.

FIG. 7 is a table showing example data center asset uptime health scores implemented in accordance with an embodiment of the invention. In various embodiments, asset uptime percentages 702 may be determined on a monthly basis for each instance of a particular data center asset 604. In certain of these embodiments, the monthly asset uptime percentages 702 may be used to generate an associated data center health score 704, which in turn may be used in various embodiments to generate a numeric data center asset health index 708. In certain embodiments, the numeric data center asset health index 708 may be calculated by dividing the actual health score (e.g., 1,025, 1,170) associated with a particular data center asset 604 by the ideal health score (e.g., 1,200). In certain embodiments, the numeric data center asset health index 708 may be used to generate a qualitative operational assessment 708 for each instance of a particular data center asset 604.

For example, as shown in FIG. 7, server 'n' has a data center asset uptime percentage 702 of 100% for twelve consecutive months, and as a result, has a data center asset health score 704 of '1,200', a numeric data center asset health index 708 of '1.00', and a qualitative operational assessment of "ideal health." However, as likewise shown in FIG. 7, server '2' does not have a data center asset uptime percentage 702 of 100% for twelve consecutive months. Instead, it had data center uptime percentages 90% for months March through May, and as a result, has a data center asset health score 704 of '1,170', a numeric data center asset health index 708 of '1.03', and a qualitative operational assessment of "slightly degraded health." Likewise, as shown in FIG. 7, server '1' does not have a data center asset uptime percentage 702 of 100% for twelve consecutive months. Instead, it has only had a data center uptime percentage 702 of 100% for months January, June, October, November, and December. As a result, it has a data center asset health score 704 of '1,025', a numeric data center asset health index 708 of '1.17', and a qualitative operational assessment of "degraded health."

FIG. 8 is a table showing example data center issue scores implemented in accordance with an embodiment of the invention. In various embodiments, certain data center issue data corresponding to one or more data center assets 604 may be collected and processed to generate a numeric data center asset issue index 808, which in turn may be used to generate an associated qualitative operational assessment 810. In certain of these embodiments, the collected data center issue data may include the number of "high" 802 issues, the number of "critical" 804 issues, and the number of "total" 806 issues associated with each data center asset 604. In certain embodiments, a data center asset issue index 808 value may be calculated by calculating the cube root of the "total" 806 number of data center asset issues.

For example, as shown in FIG. 8, data center asset 604 server '1' has 56 "high" 802 and 34 "critical" 804 data center asset issues, which when combined results in a "total" 806 number of 90 data center asset issues. As a result, it has an associated numeric data center asset index 808 of '4.48', which may be used in certain embodiments to provide a qualitative operational assessment 810 of "degraded asset performance." As likewise shown in FIG. 8, data center asset 604 server '2' has 23 "high" 802 and 12 "critical" 804 data center asset issues, which when combined results in a "total" 806 number of 35 data center asset issues. As a result, it has an associated numeric data center asset index 808 of '3.27', which may be used in certain embodiments to provide a qualitative operational assessment 810 of "slightly degraded asset performance." Likewise, shown in FIG. 8, data center asset 604 server '3' has 2 "high" 802 and 4 "critical" 804 data center asset issues, which when combined results in a "total" 806 number of 6 data center asset issues. As a result, it has an associated numeric data center asset index 808 of '1.87', which may be used in certain embodiments to provide a qualitative operational assessment 810 of "ideal asset performance."

Figures 9, 10:
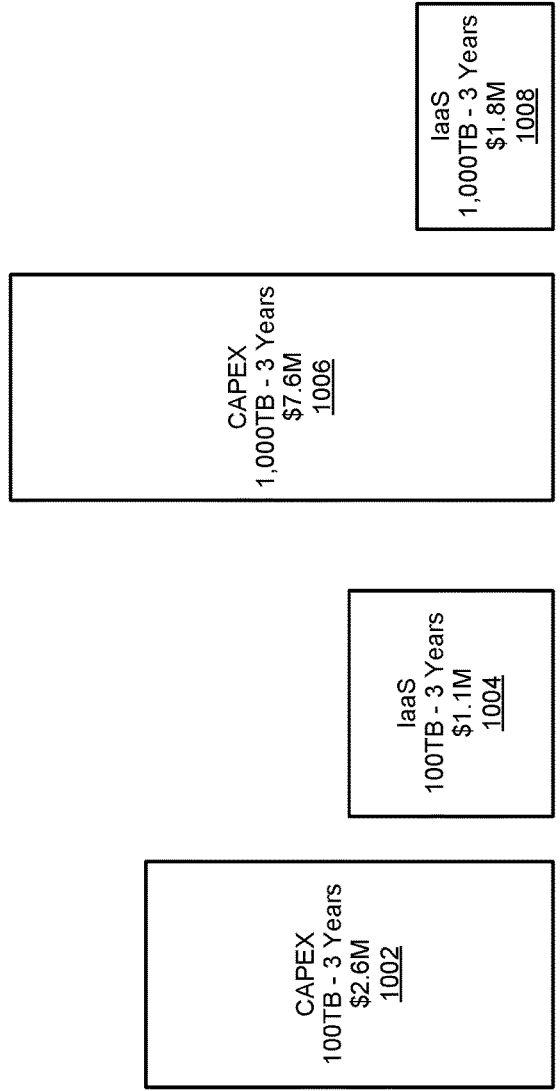
FIG. 9 is a table showing example operating costs corresponding to Capital Expenditure (CAPEX) and Infrastructure as a Service (IaaS) data center asset offerings.
FIG. 10 shows a bar chart comparing the respective cost of CAPEX and IaaS data center asset offerings.

FIG. 9 is a table showing example operating costs corresponding to Capital Expenditure (CAPEX) and Infrastructure as a Service (IaaS) data center asset offerings implemented in accordance with an embodiment of the invention.

In certain embodiments, the total cost of ownership (TCO) 910 for a CAPEX data center asset offering 610 corresponding to a particular data center asset 604 may be calculated as follows:

((health operating index 706+issue operating index 808)*capital value of CAPEX data center asset offering 610)+((health operating index 706+ issue operating index 808)*associated data center personnel costs 608)*0.2

In certain embodiments, the TCO 910 for an IaaS data center asset offering 610 corresponding to a particular data center asset 604 may be calculated as follows:

IaaS data center asset recurring service fee*total number of service fee periods FIG. 10 shows a bar chart comparing the respective cost of Capital Expenditure (CAPEX) and Infrastructure as a Service (IaaS) data center asset offerings implemented in accordance with an embodiment of the invention. In certain embodiments, a CAPEX data center asset offering may have a higher Total Cost of Ownership (TCO) compared to an equivalent IaaS data center asset offering. As an example, a CAPEX data center asset offering 1002 for 100 TB of data storage may have a three year TCO of $2.6 million, while an equivalent IaaS data center asset offering may have a corresponding TCO for the same period of time of $1.1 million. As another example, a CAPEX data center asset offering 1002 for 1,000 TB of data storage may have a three year TCO of $7.6 million, while an equivalent IaaS data center asset offering may have a corresponding TCO for the same period of time of $1.8 million.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system."

Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    identifying a plurality of data center assets within a data center, the plurality of data center assets being implemented to work in combination with one another for a particular purpose;
    monitoring, via a data center monitoring and management console, usage of the plurality of data center assets within the data center;
    generating data center asset profile data based upon the monitoring;
    identifying a plurality of asset configurations related to the asset profile data;
    ranking the plurality of asset configurations based upon the data center asset profile data;
    generating a recommended asset configuration recommendation based upon the ranking; and,
    using information associated with each of the plurality of asset configurations and the ranking of the plurality of asset configurations to generate a customer asset graph for a particular customer, the information associated with each of the plurality of asset configurations comprising workload operational and data tier usage data, customer data center asset selection criteria, data center asset statistical analysis and customer ranking and weighting data, the customer asset graph comprising a plurality of nodes and a plurality of edges, each of the plurality of nodes representing one or more of a data center asset associated with a customer data center, a proposed data center asset and a candidate data center asset, each of the plurality of edges representing candidate data center asset weighting values.

2. The method of claim 1, wherein:
    the data center asset profile data includes a data center asset selection criteria; and,
    the ranking the plurality of asset configurations takes into account the data center asset selection criteria.

3. The method of claim 2, wherein:
    each of the plurality of asset configurations include an associated asset configuration weighting factor; and,
    the ranking the plurality of asset configurations takes into account the associated asset configuration weighting indicia for each of the plurality of asset configurations.

4. The method of claim 1, further comprising:
    using the customer asset graph to identify strongly connected asset configurations.

5. The method of claim 4, wherein:
the generating the recommended asset configuration recommendation takes into account the strongly connected asset configurations.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
 identifying a plurality of data center assets within a data center, the plurality of data center assets being implemented to work in combination with one another for a particular purpose;
 monitoring, via a data center monitoring and management console, usage of the plurality of data center assets within the data center;
 generating data center asset profile data based upon the monitoring;
 identifying a plurality of asset configurations related to the asset profile data;
 ranking the plurality of asset configurations based upon the data center asset profile data;
 generating a recommended asset configuration recommendation based upon the ranking; and,
 using information associated with each of the plurality of asset configurations and the ranking of the plurality of asset configurations to generate a customer asset graph for a particular customer, the information associated with each of the plurality of asset configurations comprising workload operational and data tier usage data, customer data center asset selection criteria, data center asset statistical analysis and customer ranking and weighting data, the customer asset graph comprising a plurality of nodes and a plurality of edges, each of the plurality of nodes representing one or more of a data center asset associated with a customer data center, a proposed data center asset and a candidate data center asset, each of the plurality of edges representing candidate data center asset weighting values.

7. The system of claim 6, wherein:
the data center asset profile data includes a data center asset selection criteria; and,
the ranking the plurality of asset configurations takes into account the data center asset selection criteria.

8. The system of claim 7, wherein:
each of the plurality of asset configurations include an associated asset configuration weighting factor; and,
the ranking the plurality of asset configurations takes into account the associated asset configuration weighting indicia for each of the plurality of asset configurations.

9. The system of claim 6, wherein the instructions executable by the processor are further configured for:
using the customer asset graph to identify strongly connected asset configurations.

10. The system of claim 9, wherein:
the generating the recommended asset configuration recommendation takes into account the strongly connected asset configurations.

11. A non-transitory, computer-readable storage medium embodying computer program code, the computer program code comprising computer executable instructions configured for:
 identifying a plurality of data center assets within a data center, the plurality of data center assets being implemented to work in combination with one another for a particular purpose;
 monitoring, via a data center monitoring and management console, usage of the plurality of data center assets within the data center;
 generating data center asset profile data based upon the monitoring;
 identifying a plurality of asset configurations related to the asset profile data;
 ranking the plurality of asset configurations based upon the data center asset profile data;
 generating a recommended asset configuration recommendation based upon the ranking; and,
 using information associated with each of the plurality of asset configurations and the ranking of the plurality of asset configurations to generate a customer asset graph for a particular customer, the information associated with each of the plurality of asset configurations comprising workload operational and data tier usage data, customer data center asset selection criteria, data center asset statistical analysis and customer ranking and weighting data, the customer asset graph comprising a plurality of nodes and a plurality of edges, each of the plurality of nodes representing one or more of a data center asset associated with a customer data center, a proposed data center asset and a candidate data center asset, each of the plurality of edges representing candidate data center asset weighting values.

12. The non-transitory, computer-readable storage medium of claim 11, wherein:
the data center asset profile data includes a data center asset selection criteria; and,
the ranking the plurality of asset configurations takes into account the data center asset selection criteria.

13. The non-transitory, computer-readable storage medium of claim 12, wherein:
each of the plurality of asset configurations include an associated asset configuration weighting factor; and,
the ranking the plurality of asset configurations takes into account the associated asset configuration weighting indicia for each of the plurality of asset configurations.

14. The non-transitory, computer-readable storage medium of claim 11, wherein the instructions executable by the processor are further configured for:
using the customer asset graph to identify strongly connected asset configurations.

15. The non-transitory, computer-readable storage medium of claim 14, wherein:
the generating the recommended asset configuration recommendation takes into account the strongly connected asset configurations.

16. The non-transitory, computer-readable storage medium of claim 11, wherein:
the computer executable instructions are deployable to a client system from a server system at a remote location.

17. The non-transitory, computer-readable storage medium of claim 11, wherein:
the computer executable instructions are provided by a service provider to a user on an on-demand basis.

* * * * *